United States Patent [19]

Radtchenko

[11] Patent Number: 4,916,849
[45] Date of Patent: Apr. 17, 1990

[54] ARTIFICIAL LURE WITH TRAPEZOIDAL SHAPE

[76] Inventor: Konstantin Radtchenko, 235 Manhattan Ave., Jersey City, N.J. 07307

[21] Appl. No.: 300,950
[22] Filed: Jan. 24, 1989
[51] Int. Cl.⁴ ............................................. A01K 85/00
[52] U.S. Cl. ................................. 43/42.32; 43/42.45; 43/43.1; 43/44.9
[58] Field of Search ................. 43/42.05, 42.11, 42.15, 43/42.23, 42.32, 42.36, 42.45, 42.48, 42.49, 43.1, 43.12, 44.9, 44.93

[56] References Cited

U.S. PATENT DOCUMENTS

| | | | |
|---|---|---|---|
| 2,503,529 | 4/1950 | Wardrip | 43/42.15 |
| 2,528,861 | 11/1950 | Clasen | 43/42.48 |
| 2,635,381 | 12/1948 | Coons | 43/42.24 |
| 2,803,915 | 1/1955 | Zwiercan | 43/42.22 |
| 2,948,982 | 5/1957 | Galpin | 43/42.15 |
| 3,205,608 | 12/1963 | Dickinson | 43/42.23 |
| 3,230,658 | 5/1964 | Wuotila | 43/42.36 |
| 3,611,615 | 10/1971 | Field | 43/42.48 |
| 3,967,406 | 7/1976 | Anderson | 43/42.24 |
| 4,134,224 | 1/1979 | Clark | 43/42.5 |
| 4,188,743 | 2/1980 | Northdurft | 43/42.15 |
| 4,640,042 | 2/1987 | Rowe | 43/42.15 |

Primary Examiner—Nicholas P. Godici
Assistant Examiner—Michael William Starkweather

[57] ABSTRACT

An artificial lure has an elongated body which is shaped as tetrahedron and provided with connectors for attaching a fishing line and a fishing hook to the body.

18 Claims, 3 Drawing Sheets

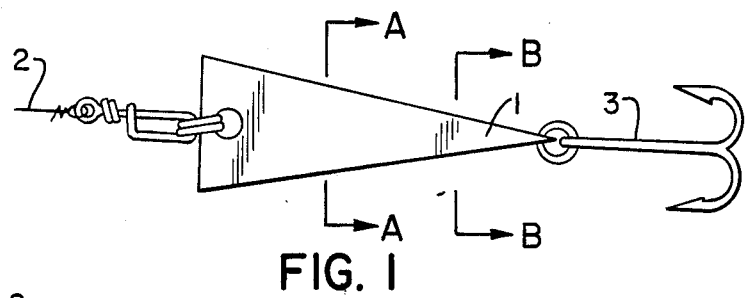
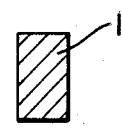
FIG. 1
FIG. 3
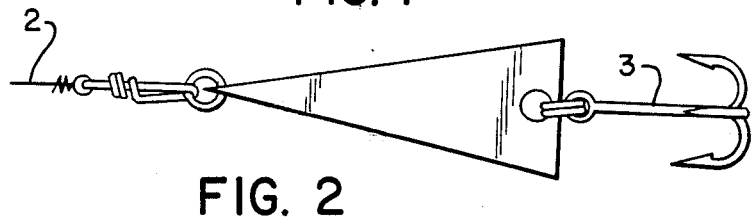
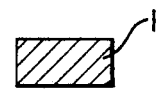
FIG. 2
FIG. 4
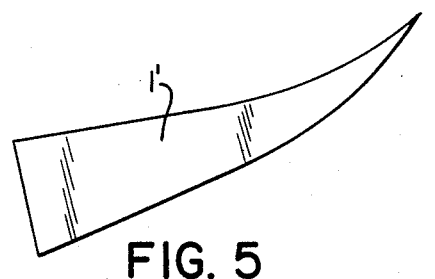
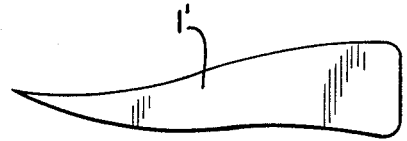
FIG. 5
FIG. 6
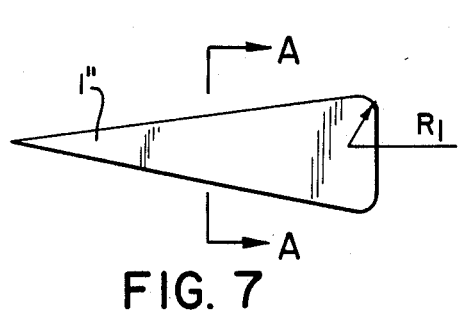
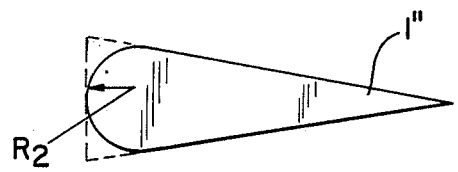
FIG. 7
FIG. 8
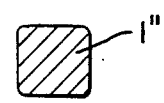
FIG. 9
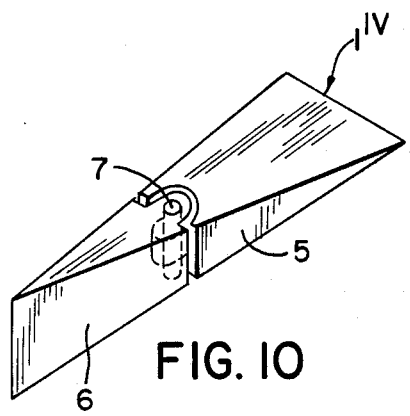
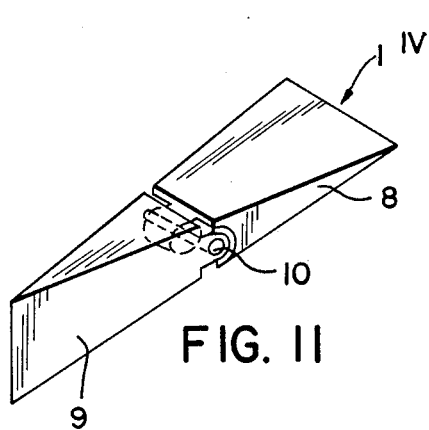
FIG. 10
FIG. 11

ARTIFICIAL LURE WITH TRAPEZOIDAL SHAPE

BACKGROUND OF THE INVENTION

The present invention relates to artificial lures.

Artificial lures are well known for fishing. They have a variety of designs which are developed for the purpose of increasing the attractiveness of the lure to fish and thereby to improve fishing take. It is believed to be understood that it would be desirable to increase further the attractiveness of the lure to fish and to increase therefore further the fishing take as as result of the use of such a lure.

SUMMARY OF THE INVENTION

Accordingly, it is an object of the present invention to provide an artificial lure which has a high attractiveness to fish.

In keeping with these objects and with others which will become apparent hereinafter, one feature of the present invention resides, briefly stated, in an artificial lure which has a body having a shape of tetrahedron. When the lure is designed in accordance with the present invention, it achieves the above specified objects.

The novel features of the invention are set forth in particular in the appended claims. The invention itself however both as to its construction and its manner of operation will be best understood from the following description of preferred embodiments which is accompanied by the following drawings.

BRIEF DESCRIPTION OF THE DRAWINGS

FIG. 1 is a side view of an artificial lure in accordance with the present invention;

FIGS. 2, 3 and 4 are a plan view and two cross sections of the lure of FIG. 1;

FIGS. 5 and 6 are views showing a side view and a plan view of the artificial lure in accordance with another embodiment of the invention;

FIGS. 7, 8 and 9 are a side view, a plan view and a cross section of the artificial lure in accordance with still another embodiment of the present invention;

FIGS. 10, 11, 12, 13 are views showing four further embodiments of a multi-part artificial lure of the present invention;

DESCRIPTION OF PREFERRED EMBODIMENTS

Figure 12:
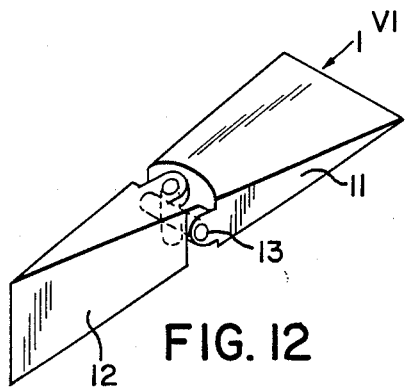

An artificial lure in accordance with the present invention has a body which is formed as tetrahedron as identified with reference numeral 1 in FIGS. 1–4. A fishing line 2 is connected with one end of the body 1, while a fishing hook 3 is connected with another end of the same. The connections are performed in a known manner, for example by passing wire connectors through holes in the body and connecting of their opposite ends with the fishing line and the fishing hook respectively.

While in the embodiment of FIGS.1–4 the body of the lue extends rectilinearly, the body 1' in the embodiment shown in FIGS. 5 and 6 is curved along the longitudinal axis of the body in a vertical direction and in a horizontal direction. It is to be understood that the body can be curved only in one direction. When the body of the lure is curved it is possible to vary the nature of gliding of the lure during its movement through water.

As shown in the embodiment of FIGS.7 and 8 the corners of the triangular sides of a body 1" can be rounded so as to impart to the lure the shape of a small fish. Also the corners of the triangles which intersect one another can be rounded as well (FIG. 9).

Figure 13:
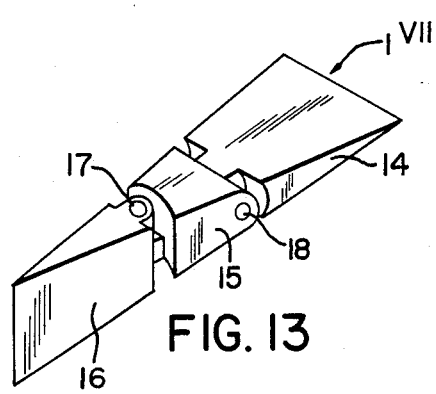

The body of the lure can be composed of several parts. In FIG. 10 parts 5 and 6 of a body $1^{iv}$ are connected with one another by a vertical axle 7. In FIG. 11 parts 8 and 9 of a body $1^v$ are connected with one another by a horizontal axle 10. In FIG. 12 parts 11 and 12 of a body$^{vi}$ are connected with one another by a cross-shaped member 13. Finally, in FIG. 13 three parts 14, 15 and 16 of a body $1^{vii}$ are connected with one anither by a vertical axle 17 and a horizontal axle 18. It is to be understood that the parts of the body $1^{vii}$ in FIG. 13 can be connected by only horizontal or only vertical axles.

Figure 14:
FIGS. 14 and 15, 16 and 17, 18 and 19, are a side view and a plan view of three further embodiments of the artificial lure as to the connection of a fishing line and a fishing hook to the lure.
Figure 15:
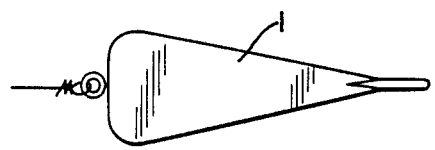

FIGS. 14 and 15 show a lure for a vertical luring, in which the fishing line 2 is connected with the rear end of the body 1, while the fishing hook 3 is connected with the front end of the body and extends upwardly.

Figure 16:
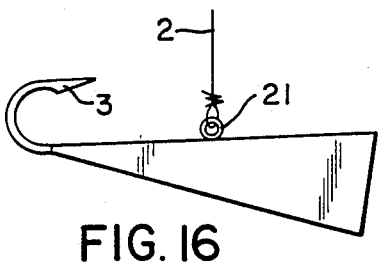
Figure 17:
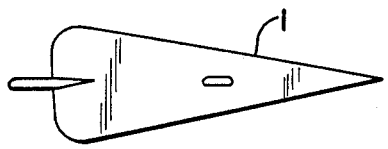
Figure 18:
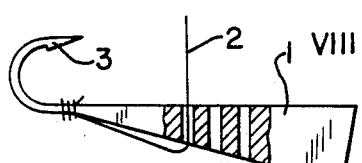
Figure 20:
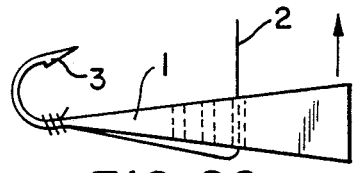
FIGS. 20, 21, 22 and 23 illustrate still further embodiments of the inventive artificial lure.
Figure 19:
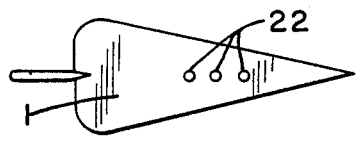
Figure 21:
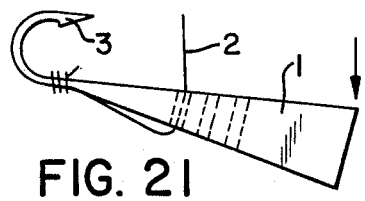

In the embodiment of FIGS. 16 and 17 the lure of a vertical luring has the fishing hook 3 connected to the rear end of the body and the fishing line 2 connected to the body by a loop 21 near the point where a vertical line extending through the center of gravity of the body intersects the upper surface of the latter.

In the two embodiments shown in FIGS. 18, 19 and 20, 21 a body $1^{viii}$ has a plurality of openings 22 which are spaced from one another in a longitudinal direction. The fishing line can pass through any of the openings to be connected to the hook. When the fishing line passes through the central opening (FIG. 18) the lure is balanced, when it passes through n opening located closer to the rear end the lure is tiltable rearwardly, and when it passes through an opening located closer to the front end the lure is tiltable forwardly, as in FIGS. 20 and 21 respectively.

Figure 22:
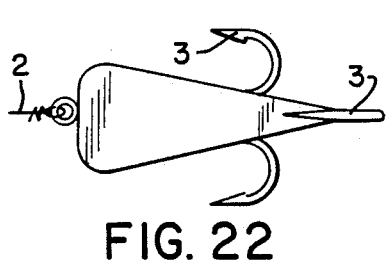
Figure 23:
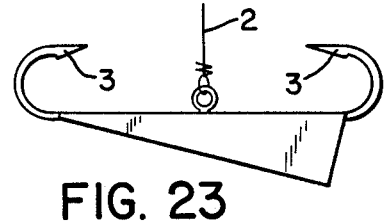

Finally, the hooks 3 can be located at both lateral sides of the body as shown in FIG. 22, or at the rear and front ends as shown in FIG. 23. In the latter case the fishing line can be connected to the body in a point which is either equidistant from the hooks, or located in the point of intersection of a vertical line extending through the center of gravity of the body and its upper surface.

The lure in accordance with the present invention can be utilized in three different types of luring. The lures of the embodiments of FIGS. 1–4 and 14–15 can be used for fishing by spinning or trolling. The lure of the embodiment of FIGS. 1–4 can be used for fishing by vertical luring of big fish of prey. The lures of the embodiments of FIGS. 16–21 can be used for fishing with a vertical luring by "death dance" resembling the movements of dying fish which dips head forward by ½–1 foot and then swims upwardly by small jolts to the same water level. Fish of prey which sees such a dying fish immediately catches it. In this mode the lure is sharply lowered by 178 –1 foot, then raised by small pushes(5–6 pushes) up to the former level, then make a pause for 2–6 sec, and repeat the cycle again. During the sharp lowering of the lure, it glides downwardly and sideways as a fish, and then is returned to its initial position.

The invention is not limited to the details shown since various modifications and structural changes are possible without departing in any way from the spirit of the present invention.

What is desired to be protected by Letters Patent is set forth in particular in the appended claims.

I claim:

1. An artificial lure, comprising
an elongated body having a shape of tetrahedron with two congruent plane triangles forming upper and lower surfaces and two further congruent plane triangles forming lateral surfaces of said body, said body having two opposite ends, said upper and lower surfaces intersecting one another at one of said ends and forming a horizontally disposed edge, said lateral surfaces intersecting one another at the other of said ends and forming a vertically disposed edge, said body having any cross section along a longitudinal axis formed as a rectangle.

2. An artificial lure as defined in claim 1; and further comprising means for attaching a fishing line and means for attaching a fishing hook to said body.

3. An artificial lure as defined in claim 1, wherein said body has a longitudinal axis and is curved in a horizontal direction along said longitudinal axis.

4. An artificial lure as defined in claim 1, wherein said body has a longitudinal axis and is curved in a vertical direction along said longitudinal axis.

5. An artificial lure as defined in claim 1, wherein said body has a plurality of corners, at least some of said corners are rounded.

6. An artificial lure as defined in claim 1, wherein said body has a plurality of corners, said corners being rounded.

7. An artificial lure as defined in claim 1, wherein said body has at least two parts pivotally connected with one another; and further comprising means for connecting said parts with one another and including a substantially vertical pivot axle.

8. An artificial lure as defined in claim 1, wherein said body has at least two parts pivotally connected with one another; and further comprising means for connecting said parts with one another and including a substantially horizontal pivot axle.

9. An artificial lure as defined in claim 1, wherein said body has at least two parts pivotally connected with one another so that said parts can rotate relative to one another about vertical and horizontal axes but cannot rotate relative to one another about longitudinal axis; and further comprising means for pivotally connecting said parts with one another, including a cross shaped member.

10. An artificial lure as defined in claim 1, wherein said body has three parts pivotally connected with one another; and further comprising means for connecting said parts with one another and including two axles extending transversely relative to each other.

11. An artificial lure as defined in claim 10, wherein said axles of said connecting means extend perpendicularly relative to one another.

12. An artificial lure as defined in claim 10, wherein said axles extend relative to one another at an angle which differs from 90°.

13. An artficial lure as defined in claim 1, wherein said body has front and rear ends and is provided with first attaching means at said front end for attaching a fishing line and second attaching means at said rear end for attaching a fishing hook to extend rearwardly and upwardly.

14. An artificial lure as defined in claim 1, wherein said body has a front end and is provided with attaching means at said front end for attaching a fishing hook to extend rearwardly and upwardly.

15. An artificial lure as defined in claim 1, wherein said body has at least one opening located near a point of intersection of a vertical line extending through a center of gravity of said body and an upper surface of said body, for passing a fishing line through said opening.

16. An artificial lure as defined in claim 1, wherein said body has a plurality of opening spaced from one another in a longitudinal direction and located near a point of intersection of a vertical line extending through a center of gravity of said body and an upper surface of said body, so that a fishing line can be selectively passed through one of said openings.

17. An artificial lure as defined in claim 1, wherein said body has two lateral-sides each provided with means for attaching a fishing hook to said body.

18. An artificial lure as defined in claim 1, wherein said body has front end rear ends each provided with means for attaching a fishing hook to said body.

* * * * *